(12) United States Patent
Fu et al.

(10) Patent No.: US 11,845,239 B1
(45) Date of Patent: Dec. 19, 2023

(54) MOBILE DISMANTLING SYSTEM FOR DISMANTLING SOLAR CELL MODULE

(71) Applicants: Taiwan Solar Greenergy Corporation, Tainan (TW); TSGC Technologies Inc., Tainan (TW)

(72) Inventors: Yao-Hsien Fu, Kaohsiung (TW); Chia-Tsung Hung, Tainan (TW)

(73) Assignee: TSGC Technologies, Inc., Tainan (TW)

( * ) Notice: Subject to any disclaimer, the term of this patent is extended or adjusted under 35 U.S.C. 154(b) by 13 days.

(21) Appl. No.: 17/859,965

(22) Filed: Jul. 7, 2022

(51) Int. Cl.
*B32B 43/00* (2006.01)
*B32B 17/10* (2006.01)

(52) U.S. Cl.
CPC ...... *B32B 17/10678* (2013.01); *B32B 43/006* (2013.01); *Y10S 156/922* (2013.01); *Y10S 156/937* (2013.01); *Y10T 156/1142* (2015.01); *Y10T 156/1168* (2015.01); *Y10T 156/1978* (2015.01); *Y10T 156/1983* (2015.01)

(58) Field of Classification Search
CPC ............. B32B 43/006; Y10T 156/1142; Y10T 156/1168; Y10T 156/1978; Y10T 156/1983; Y10S 156/922; Y10S 156/937
See application file for complete search history.

(56) References Cited

U.S. PATENT DOCUMENTS

| | | | |
|---|---|---|---|
| 11,491,774 B1* | 11/2022 | Lee | .......................... H01L 31/18 |
| 11,491,775 B1* | 11/2022 | Lee | ....................... B32B 43/006 |
| 2022/0140175 A1* | 5/2022 | Matsumoto | ............. H01L 31/18 |
| | | | 29/762 |

FOREIGN PATENT DOCUMENTS

| WO | WO-2013057035 A1 * | 4/2013 | ............... B02C 4/08 |
|---|---|---|---|
| WO | WO-2021017236 A1 * | 2/2021 | |

* cited by examiner

*Primary Examiner* — Philip C Tucker
*Assistant Examiner* — Nickolas R Harm
(74) *Attorney, Agent, or Firm* — Hammer & Associates, P.C.

(57) ABSTRACT

A mobile dismantling system includes an automatic frame dismantling apparatus, a fragmenting apparatus, and a conveying apparatus, all of which are disposed on a mobile apparatus, such as a wheeled transport vehicle. The automatic frame dismantling apparatus includes a dismantling platform and frame dismantling members. The fragmenting apparatus includes a back plate fragmenting device and a cell encapsulation laminate fragmenting device, each of which has a fragmenting platform, a fragmenting unit, and a material collecting and sorting device. The conveying apparatus is disposed above the automatic frame dismantling apparatus and the fragmenting apparatus, and includes a robot for moving solar cell module.

13 Claims, 4 Drawing Sheets

MOBILE DISMANTLING SYSTEM FOR DISMANTLING SOLAR CELL MODULE

FIELD

The disclosure relates to a mobile dismantling system for dismantling a solar cell module.

BACKGROUND

An existing solar cell module is mainly composed of a solar cell panel, cover plate and back plate respectively disposed at two opposite surfaces of the solar cell panel, adhesive layers respectively sandwiched between the solar cell panel and the cover plate and between the solar cell panel and the back plate, and a frame disposed around the solar cell panel, the cover plate and the back plate. Traditionally, during dismantling the solar cell module, used solar cell modules are manually transported and dismantled, and the dismantled recycled materials are manually collected, thereby not only causing the operator's burden but also affecting the subsequent dismantling processes, and also consuming labor time and costs.

Currently, when the cover and back plates are dismantled, the whole solar cell module is directly crushed, after which the crushed solar cell module is thermally decomposed so that the cover plate, the solar cell panel, and the back plate are separated from each other as a result of chemical changes in the adhesive layers.

However, the cover plate and the solar cell panel obtained by the thermal decomposition which have been contaminated can lower economic benefits of subsequent recycling. Further, because the material used for the back plate is polyvinylidene difluoride (PVDF) or polyvinyl fluoride (PVF), it will produce hydrofluorocarbons (HFCs) and other substances harmful to the environment during the thermal decomposition process. Therefore, not only does the environment be polluted, but a high energy consumption requirement is also not economical.

In addition, the value-to-weight ratio of used solar cell modules and the recycled materials thereof are low, and recycling the used solar cell module usually encounters problems of high transportation costs, Thus, how to dismantle the solar cell modules in compliance with environmental protection regulations and how to provide a mobile production line for recycling solar cell modules are important issues to be solved by the technical personnel in this field.

SUMMARY

Therefore, an object of the present disclosure is to provide a mobile dismantling system for dismantling a solar cell module. The solar cell module includes a solar cell unit and an outer frame surrounding the solar cell unit. The solar cell unit includes a cell encapsulation laminate, and a back plate and a cover plate respectively disposed on two opposite sides of the cell encapsulation laminate.

The mobile dismantling system includes a mobile apparatus, an automatic frame dismantling apparatus, a fragmenting apparatus, and a conveying apparatus.

The automatic frame dismantling apparatus is disposed on the mobile apparatus, and includes a dismantling platform for supporting the solar cell module, and at least two frame dismantling members disposed respectively at symmetric positions of the outer frame for gripping and dismantling the outer frame.

The fragmenting apparatus is disposed on the mobile apparatus, and includes a back plate fragmenting device disposed downstream of the automatic frame dismantling apparatus for fragmenting the back plate, and a cell encapsulation laminate fragmenting device disposed downstream of the back plate fragmenting device, Each of the back plate fragmenting device and the cell encapsulation laminate fragmenting device has a fragmenting platform for supporting the solar cell unit, a fragmenting unit disposed on the fragmenting platform and movable in three axial directions for fragmenting one of the back plate and the cell encapsulation laminate, and a material collecting and sorting device connected to the fragmenting platform for collecting recycled materials produced by the fragmenting unit.

The conveying apparatus is disposed above the automatic frame dismantling apparatus and the fragmenting apparatus, and includes at least one robot for moving the solar cell module between the automatic frame dismantling apparatus and the fragmenting apparatus.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
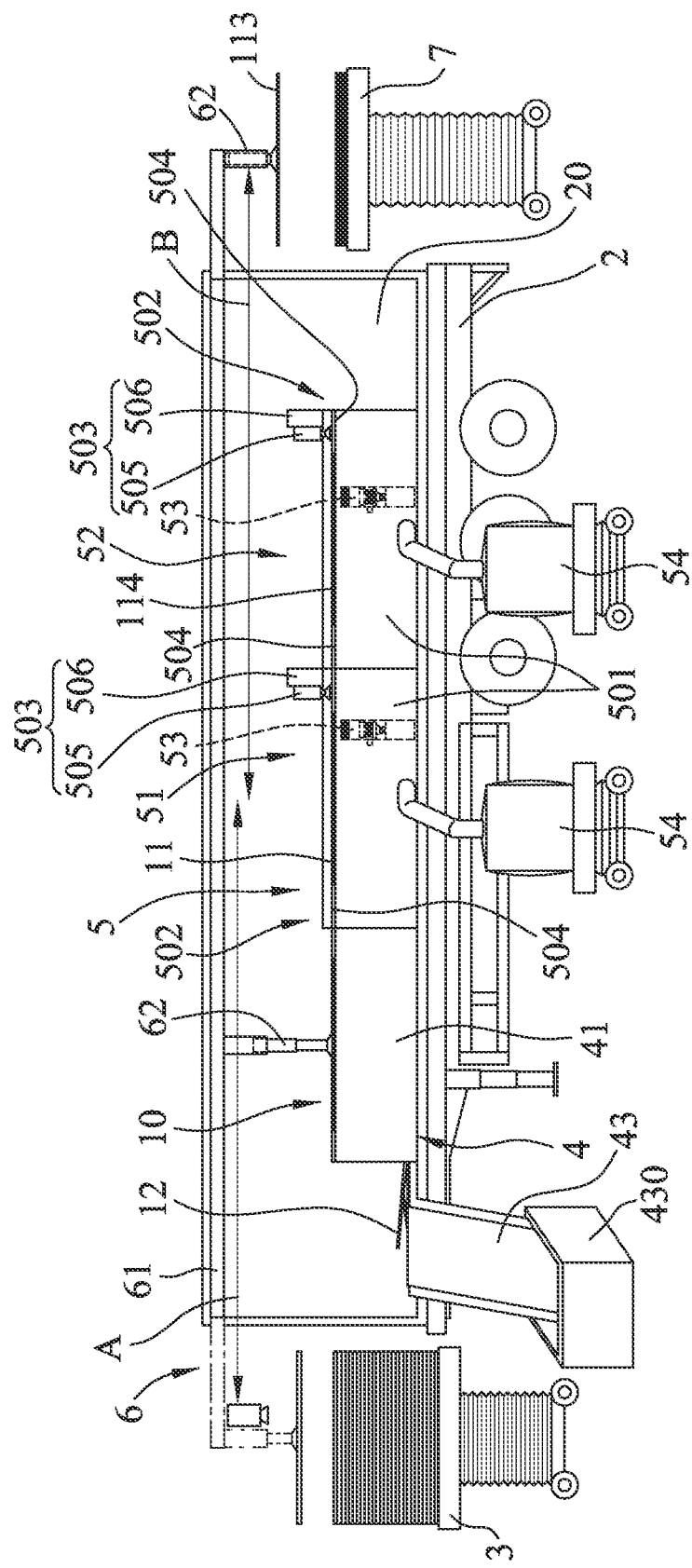
FIG. 1 is a schematic view of a mobile dismantling system for dismantling a solar cell module according an embodiment of the disclosure.
Figure 2:
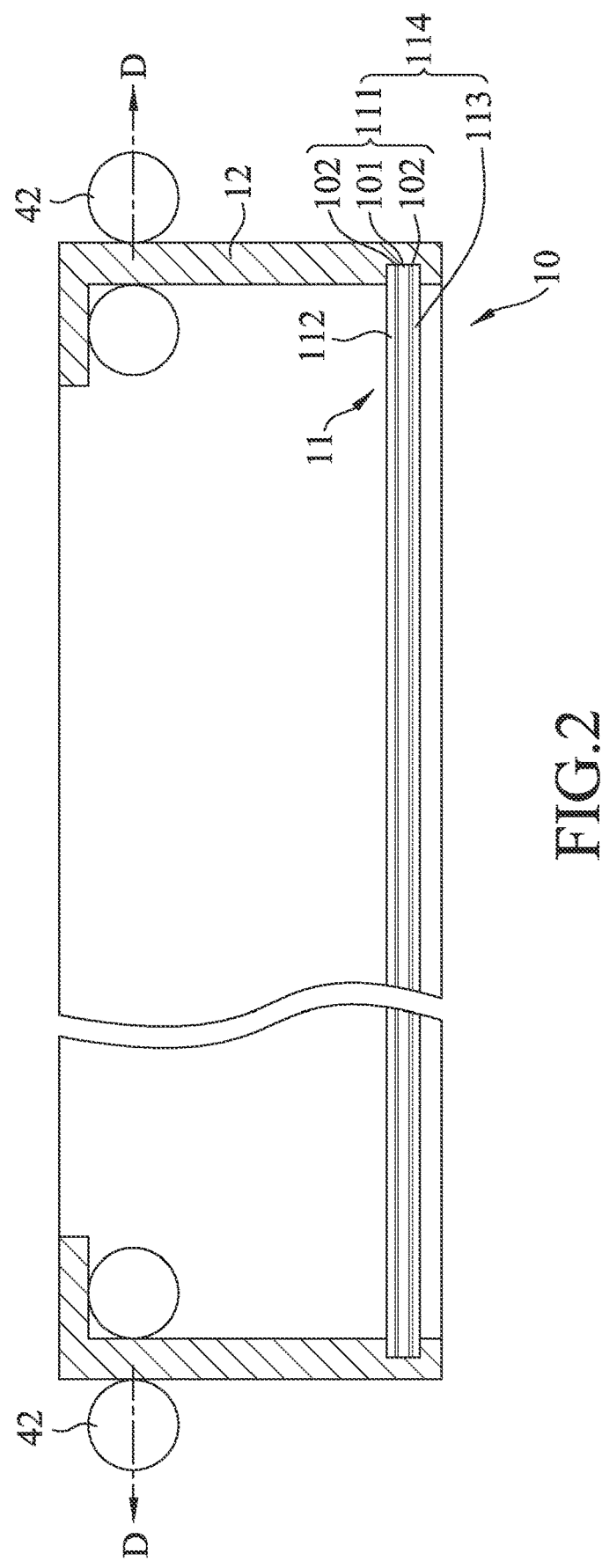
FIG. 2 is a fragmentary schematic sectional view of the embodiment, illustrating frame dismantling members of the mobile dismantling system gripping the solar cell module.
Figure 3:
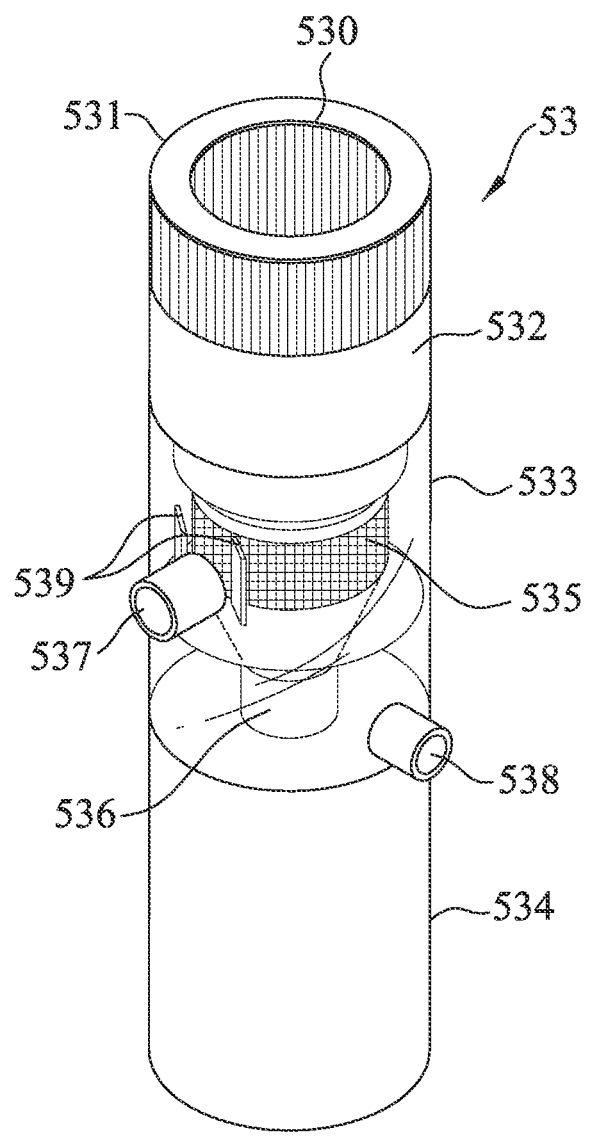
FIG. 3 is a perspective schematic view of a material-collecting and sorting device of the embodiment.

FIGS. 1 to 3 illustrate a mobile dismantling system according to an embodiment of the present disclosure. The mobile dismantling system includes a mobile apparatus 2, an elevator 3, an automatic frame dismantling apparatus 4, a fragmenting apparatus 5, a conveying apparatus 6, and a cover plate recycling apparatus 7. The mobile dismantling system is suitable for dismantling a solar cell module 10 and recycling products which are obtained after the cell module 10 is dismantled.

The elevator 3 is disposed upstream of the automatic frame dismantling apparatus 4. The automatic frame dismantling apparatus 4 and the fragmenting apparatus 5 are disposed in a receiving space 20 of the mobile apparatus 2. The fragmenting apparatus 5 is located downstream of the automatic frame dismantling apparatus 4. The conveying apparatus 6 is disposed above the automatic frame dismantling apparatus 4 and the fragmenting apparatus 5. The cover plate recycling apparatus 7 is disposed downstream of the fragmenting apparatus 5.

The mobile apparatus 2 is movable for performing transport functions. That is, through the automatic frame dismantling apparatus 4, the fragmenting apparatus 5, and the conveying apparatus 6 disposed on the mobile apparatus 2, the recycling production line of the solar cell module 10 is mobile to a solar power deployment site or distribution center for direct or in situ recycling, thereby effectively reducing transportation costs to travel back and forth to a factory.

The mobile apparatus 2 may be a wheeled transport vehicle, for example, one of a lorry and a truck, but is not limited thereto, as long as the automatic frame dismantling apparatus 4, the fragmenting apparatus 5, and the conveying apparatus 6 can be accommodated by and moved with the mobile apparatus 2.

The solar cell module 10 includes a solar cell unit 11 and an outer frame 12 surrounding the solar cell unit 11. The solar cell unit 11 includes a cell encapsulation laminate 111, and a back plate 112 and a cover plate 113 respectively disposed on two opposite sides of the cell encapsulation laminate 111. The cell encapsulation laminate 111 is composed of a solar cell panel 101 and two adhesive layers 102 respectively disposed on two opposite sides of the solar cell panel 101. The back plate 112 and the cover plate 113 are connected to the solar cell panel 101 through the adhesive layers 102.

The elevator 3 carries the solar module 10 which is to be dismantled. The conveying apparatus 6 includes a monorail 61 extending across the automatic frame dismantling apparatus 4 and the fragmenting apparatus 5, and two robots 62 moveably disposed on the monorail 61. The robots 62 can suck r.

and move the solar cell module 10 placed on the elevator 3. One of the robots 62 is movable between the elevator 3 and the fragmenting apparatus 5 (a path A as shown in FIG. 1), and the other one of the robots 62 is movable between the fragmenting apparatus 5 and the cover plate recycling apparatus 7 (a path B as shown in FIG. 1). In this embodiment, the robots 62 suck the solar cell module 10 (without or with being dismantled) by vacuum suction, but is not limited thereto. To move the solar cell module 10, the robot 62 may also pick up the solar module 10 by gripping or by other methods. Noteworthily, the number of the robots 62 is not particularly limited, and may be one or more than two.

The automatic frame dismantling apparatus 4 includes a dismantling platform 41 for supporting the solar cell module 10, two frame dismantling members 42 disposed at positions symmetrical to each other, a collecting track 43 disposed on a side of the dismantling platform 41, and a collecting box 430 disposed downstream of and below the collecting track 43. Specifically, when the solar cell module 10 is placed on the dismantling platform 41, the two frame dismantling members 42 are disposed respectively at symmetric positions of the outer frame 12, and grip and dismantle the outer frame 12, so that the dismantled outer frame 12 directly drops onto the collecting track 43 and is conveyed into the collecting box 430, thereby obtaining the solar cell unit 11.

The fragmenting apparatus 5 includes a back plate fragmenting device 51 disposed downstream of the automatic frame dismantling apparatus 4, and a cell encapsulation laminate fragmenting device 52 disposed downstream of the back plate fragmenting device 51. In this embodiment, the back fragmenting device 51 is substantially the same as the cell encapsulation laminate fragmenting device 52. That is to say, they both are the same device and have the same components. The only difference resides in that the back plate fragmenting device 51 is used for fragmenting the back plate 112, whereas the cell encapsulation laminate fragmenting device 52 is used for dismantling the cell encapsulation laminate 111 after the back plate 112 is fragmented.

In this embodiment, each of the back plate fragmenting device 51 and the cell encapsulation laminate fragmenting device 52 has a fragmenting platform 501, a flattening unit 502 disposed on the fragmenting platform 501, a fragmenting unit 503 that is disposed on the fragmenting platform 501 and that is movable in three axial directions for fragmenting one of the back plate 112 and the cell encapsulation laminate 111, a material collecting and sorting device 53 connected to the fragmenting platform 501 for collecting recycled materials produced by the fragmenting unit 503, and a material collection bag 54 connected to the material collecting and sorting device 53.

In detail, the flattening unit 502 of each of the back plate fragmenting device 51 and the cell encapsulation laminate fragmenting device 52 has two fixing members 504 (only one is shown in FIG. 1) to fix one of the solar cell unit 11 and a yet-to-be fragmented product 114 composed of the cell encapsulation laminate 111 and the cover plate 13 to the fragmenting platform 501 of one of the back plate fragmenting device 51 and the cell encapsulation laminate fragmenting device 52. The number and the configuration of the fixing members 504 are not particularly limited. The number of the fixing member 504 may be one or more than two, as long as the solar cell unit 11 can be stably and flatly fixed to the fragmenting platform 501. In this embodiment, each fixing member 504 is exemplified as a press plate disposed at a lateral side of the fragmenting platform 501. The fixing members 504 (i.e. the press plates) assist the solar cell unit 11 to be fixedly disposed between the fragmenting platform 501 and the press plate, thereby preventing the solar cell unit 11 from warping. In order to make the solar cell unit 11 flatter on the fragmenting platform 501, the flattening unit 502 can further include a suction assembly (not shown) disposed on the fragmenting platform 501 for suctioning the solar cell unit 10. The suction assembly, as an example, includes a plurality of suction holes extending through the fragmenting platform 501, and an air suction member connected to the suction holes. When the air suction member is operated to suck air through the suction holes, the solar cell unit 11 can be stably adsorbed on the fragmenting platform 501.

To produce recycled materials by physically fragmenting one of the back plate 112 and the cell encapsulation laminate 111, the fragmenting unit 503 has a fragmenting member 505 for fragmenting one of the back plate 112 and the cell encapsulation laminate 111, and a drive unit 506 connected to the fragmenting member 505. The drive unit 506 drives the fragmenting member 505 to move in the three axial directions for fragmenting the back plate 112 or the cell encapsulation laminate 111.

It should be noted that the number of the fragmenting member 505 is not limited, and may be a single one or more than two. The number of the fragmenting members 505 may be changed according to the situation and application. There is no particular restriction on the selection of the fragmenting member 505 suitable for this disclosure. As long as the fragmenting member 505 can physically fragment the back plate 112 or the cell encapsulation laminate 111 by shaving, milling, scraping, cutting, or planing, any type of the fragmenting member 505 is acceptable. In this embodiment, the fragmenting member 505 is exemplified as having a CNC spindle to perform shaving (i.e., to drive a tool for shaving, milling, scraping, cutting, or planing, or the like). The drive unit 506 is connected to the fragmenting member 505 so as to drive the same to move in the three axial directions. The configuration of the drive unit 506 is not particularly limited as long as it can drive the fragmenting member 505. For example, the drive unit 506 may be composed of horizontal and vertical transmission mechanisms, and a drive motor connected to the horizontal and vertical transmission mechanisms.

Figure 4:
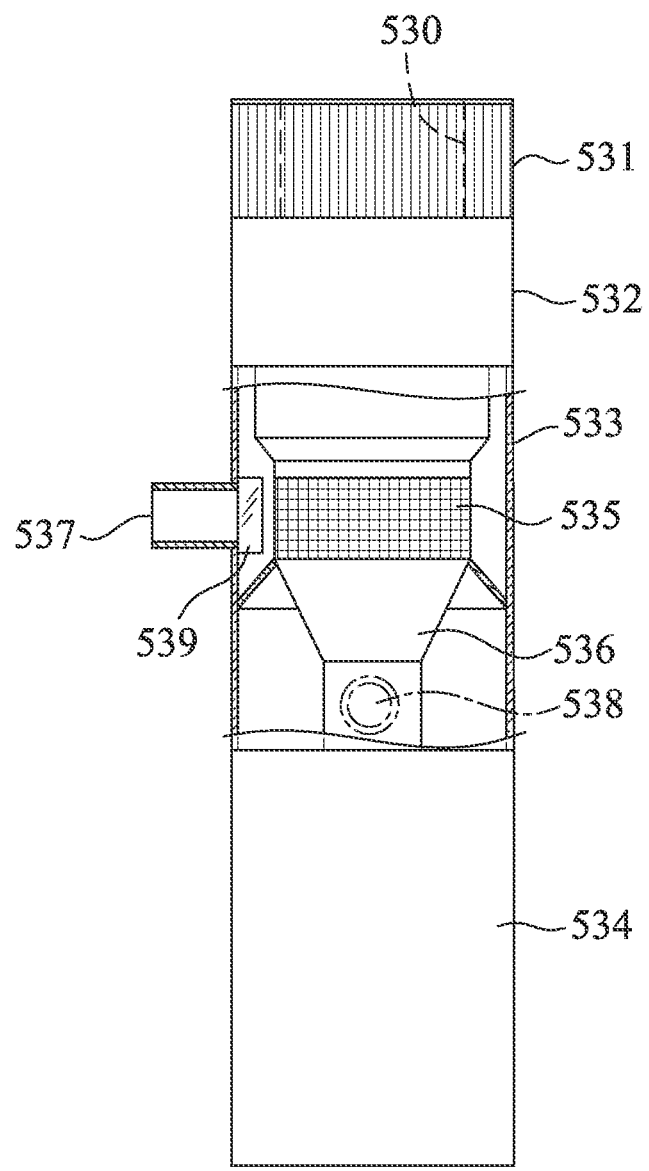
FIG. 4 is a partly schematic sectional view of the material-collecting and sorting device of the embodiment.

Referring to FIG. 4, in combination with FIGS. 1 and 3, for each of the back plate fragmenting device 51 and the cell encapsulation fragmenting device 52, the material collecting and sorting device 53 includes an air filter 531 having an exhaust opening 530, a blower 532 connected to the air filter 531 and generating forced airflow, a sorting unit 533 connected to the blower 532, and a material-collecting container 534 removably connected to the sorting unit 533. The sorting unit 533 includes a material inlet 537 connected to the fragmenting member 505, a fragment size sorting screen 535, a gas-solid cyclone separator 536 connected to the screen 535 for collecting fragmented solar cell powder, and a material outlet 538 connected to the material collection bag 54.

In detail, the blower 532 of the material collecting and sorting device 53 can produce a forced airflow path, and through this airflow, the recycled materials can be guided into the material collecting and sorting device 53 through the material inlet 247, after which the recycled materials pass through the fragment size sorting screen 535 and the gas-solid cyclone separator 536, and then are discharged from the material outlet 538. Simultaneously, clean air is discharged through the exhaust opening 530. Further, one or more flow-guiding plates 539 can be disposed in an interior of the sorting unit 533 at a position proximate to the material inlet 537, so that when the recycled materials enter the material inlet 537 and pass through the flow-guiding plates 539, the flow-guiding plates 539 produces a free vortex to increase the screening effect of the fragment size sorting screen 535. As a result, the recycled materials are separated by the fragment size sorting screen 535 and a vortex effect into small fragments of the recycled materials and large fragments of the recycled materials. By virtue of the gas-solid cyclone separator 536 separating solid from gas, the small fragments of the recycled materials enter the gas-solid cyclone separator 536 through the airflow path, and are collected in the material-collecting container 534. On the other hand, the large fragments of the recycled materials are limited by the size of the fragment size sorting screen 535, and as the flow rate decreases, they sunk and are accumulated at the bottom of the sorting unit 533 and are then discharged from the material outlet 538.

To dismantle the solar cell module 10, the cover plate 113 faces downwardly and is placed on the elevator 3. The height of the elevator 3 is adjustable to cooperate with the height of the automatic frame dismantling apparatus 4 located downstream thereof. The robot 62 adjacent to the elevator 3 contacts with the back plate 112 of the solar cell module 10 on the elevator 3 and moves the solar cell module 10 by sucking it to move to the automatic frame dismantling apparatus 4 and to be positioned on the dismantling platform 41. The frame dismantling members 42 are driven by, for example, a hydraulic cylinder device, to grip the outer frame 12, and to move outwardly from each other (as shown by arrows 0 in FIG. 2), thereby dismantling the outer frame 12 from the solar cell unit 11. Because the dismantled outer frame 12 directly drops onto the collecting track 43 and is conveyed into the collecting box 430, a high degree of automation in material collection can be achieved to avoid manual picking.

After the outer frame 12 is dismantled, the same robot 62 sucks and moves the solar cell unit 11 to the fragmenting platform 501 of the back plate fragmenting device 51. With the flattening unit 502 of the back plate fragmenting device 51, the solar cell unit 11 is stably fixed to the fragmenting platform 501. Because the back plate 112 is to be dismantled first, the solar cell unit 11 is placed on the fragmenting platform 501 in such a manner that the back plate 112 faces away from the fragmenting platform 501 and is located between the fragmenting platform 501 and the fragmenting unit 503 of the back plate fragmenting device 51.

Subsequently, at the back plate fragmenting device 51, the drive unit 506 drives the fragmenting member 505 to move in the three axial directions and to fragment the back plate 112 by the physical method of shaving to leave the yet-to-be fragmented product 114 composed of the cell encapsulation laminate 111 and the cover plate 113. Because the fragmenting member 505 is exemplified as having a CNC spindle to cooperate with the drive unit 506, the fragmenting member 505 can move in a three-dimensional space with an accuracy that can reach a micron ($\mu$m) level. The recycled materials produced from the fragmented back plate 112 are directly sucked into the material collecting and sorting device 53 to be collected and sorted, and are collected into the material collection bag 54.

It should be noted that the solar cell unit 11 is a layered structure and the back plate 112 is disposed atop a correspond one of the adhesive layers 102 of the cell encapsulation laminate 111. The fragmenting member 505 will contact the corresponding adhesive layer 102 when shaving the back plate 112. Since the back plate 112 is mainly made of a material, such as polyvinylidene difluoride (PVDF), and since each adhesive layer 102 is made of a material, such as ethylene vinyl acetate (EVA), there is a difference in the degree of hardness between the two. As such, in this embodiment, the fragmenting member 505 can further have a sensor (not shown) for detecting a resistance change data. At the back plate fragmenting device 51, when the fragmenting member 505 contacts the corresponding adhesive layer 102 after the back plate 12 has been shaved off, a change in resistance will be detected by the sensor. In this way, the fragmenting member 505 of the back plate fragmenting device 51 will be prevented from shaving the cell encapsulation laminate 111 when shaving the back plate 112.

After the back plate 112 is dismantled, the other robot 62 sucks and moves the yet-to-be fragmented product 114 from the back plate fragmenting device 51 to the fragmenting platform 501 of the cell encapsulation laminate fragmenting device 52 for fragmenting the cell encapsulation laminate 111, The fragmenting unit 503 of the cell encapsulation laminate fragmenting device 52 contacts and penetrates the cell encapsulation laminate 111 until it abuts against the cover plate 113, and, subsequently, fragments the cell encapsulation laminate 111 by physically shaving, thereby directly removing the entire cell encapsulation laminate 111 (i.e. the adhesive layer 102, the solar cell panel 101, the adhesive layer 102).

Since the cell encapsulation laminate 111 is composed of the solar cell panel 101 and the adhesive layers 102, solar cell fragments and adhesive layer fragments are produced after the cell encapsulation laminate 111 is fragmented. Due to the difference in Young's modulus, there is a great difference between the fragment size of the solar cell fragments and the fragment size of the adhesive layer fragments, which are measured in micron ($\mu$m) range and in millimeter (mm) range, respectively. Thus, the recycled materials generated by fragmenting the cell encapsulation laminate 111 will be sucked into the material collecting and sorting device 53 for collecting and sorting. After the solar cell fragments and the adhesive layer fragments are collected in the material collecting and sorting device 53, they are further separated by cyclone action and a sieving method. With a single equipment to simultaneously achieve the effects of suctioning, sorting and collecting of recycling materials, the costs of recycling is reduced and the production value is increased. The robot 62 adjacent to the cover plate recycling apparatus 7 sucks and moves the cover plate 13 to the cover plate recycling apparatus 7.

Noteworthily, by using the mobile dismantling system of this disclosure to dismantle the solar cell module 10 and the dismantling method thereof, it is apparent that the dismantling process is all physical, and does not include any chemical process, Further, there is absolutely no added water or thermal process. The dismantling process is completed in an anhydrous and normal temperature environment, which not only can effectively reduce the cost of the dismantling process, but also the physical properties of the recycled materials after dismantling will not change and can be completely preserved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mobile dismantling system for dismantling a solar cell module that includes a solar cell unit and an outer frame surrounding the solar cell unit, the solar cell unit including a cell encapsulation laminate, and a back plate and a cover plate respectively disposed on two opposite sides of the cell encapsulation laminate, the mobile dismantling system comprising:
    a mobile apparatus;
    an automatic frame dismantling apparatus disposed on said mobile apparatus, and including a dismantling platform for supporting the solar cell module; and at least two frame dismantling members disposed respectively at symmetric positions of the outer frame for gripping and dismantling the outer frame;
    a fragmenting apparatus disposed on said mobile apparatus, and
    including a back plate fragmenting device disposed downstream of said automatic frame dismantling apparatus for fragmenting the back plate; and a cell encapsulation laminate fragmenting device disposed downstream of said back plate fragmenting device; each of said back plate fragmenting device and said cell encapsulation laminate fragmenting device having a fragmenting platform for supporting the solar cell unit, a fragmenting unit disposed on said fragmenting platform and movable in three axial directions for fragmenting one of the back plate and the cell encapsulation laminate, and a material collecting and sorting device connected to said fragmenting platform for collecting recycled materials produced by said fragmenting unit; and
    a conveying apparatus disposed above said automatic frame dismantling apparatus and said fragmenting apparatus, and including at least one robot for moving the solar cell module between said automatic frame dismantling apparatus and said fragmenting apparatus.

2. The mobile dismantling system as claimed in claim 1, further comprising an elevator disposed upstream of said automatic frame dismantling apparatus for placement of the solar cell module.

3. The mobile dismantling system as claimed in claim 2, wherein said at least one robot is configured to drive the solar cell module to move from said elevator to said automatic frame dismantling apparatus and to be positioned on said dismantling platform.

4. The mobile dismantling system as claimed in claim 1, wherein said conveying apparatus further includes a monorail, said at least one robot including two robots moveably disposed on said monorail, one of said robots being movable between said automatic frame dismantling apparatus and said back plate fragmenting device, the other one of said robots being movable between said back plate fragmenting device and said cell encapsulation laminate fragmenting device.

5. The mobile dismantling system as claimed in claim 1, wherein said at least one robot is configured to pick up the solar cell module by vacuum suction.

6. The mobile dismantling system as claimed in claim 1, wherein said automatic frame dismantling apparatus further includes a collecting track disposed on a side of said dismantling platform, and a collecting box disposed downstream of and below said collecting track so that the dismantled outer frame directly drops onto said collecting track and is conveyed into said collecting box.

7. The mobile dismantling system as claimed in claim 1, wherein:
    said fragmenting platform of said back plate fragmenting device is configured to support the solar cell unit, and said fragmenting unit of said back plate fragmenting device is configured to contact and fragment the back plate, leaving a yet-to-be fragmented product; and
    said fragmenting platform of said cell encapsulation laminate fragmenting device is configured to support the yet-to-be fragmented product, and said fragmenting unit of said cell encapsulation laminate fragmenting device is configured to contact and fragment the cell encapsulation laminate of the yet-to-be fragmented product.

8. The mobile dismantling system as claimed in claim 7, wherein each of said back plate fragmenting device and said cell encapsulation fragmenting device further has a flattening unit that is disposed on said fragmenting platform and that has at least one fixing member, said at least one fixing member being a press plate disposed at a lateral side of said fragmenting platform such that the solar cell unit is disposed between said fragmenting platform and said press plate.

9. The mobile dismantling system as claimed in claim 1, wherein, for each of said back plate fragmenting device and said cell encapsulation laminate fragmenting device, said fragmenting unit has a fragmenting member for fragmenting one of the back plate and the cell encapsulation laminate, and a drive unit connected to said fragmenting member, said drive unit driving said fragmenting member to move in the three axial directions for fragmenting one of the back plate and the cell encapsulation laminate.

10. The mobile dismantling system as claimed in claim 9, wherein said fragmenting member is configured to physically fragment one of the back plate and the cell encapsulation laminate by shaving, milling, scraping, cutting, or planing.

11. The mobile dismantling system as claimed in claim 1, wherein, for each of said back plate fragmenting device and said cell encapsulation laminate fragmenting device, said material collecting and sorting device includes an air filter having an exhaust opening, a blower connected to said air filter, a sorting unit connected to said blower, and a material-collecting container removably connected to said sorting unit.

12. The mobile dismantling system as claimed in claim 11, wherein:
   said sorting unit including a fragment size sorting screen, a gas-solid cyclone separator connected to said screen, a material inlet, a material outlet, and a flow-guiding plate disposed at said material inlet; and
   the recycled materials enter from said material inlet, pass through said flow-guiding plate, and are separated by said fragment size sorting screen and a vortex effect into small fragments of the recycled materials and large fragments of the recycled materials so that the small fragments are collected by said material-collecting container and the large fragments are discharged from said material outlet.

13. The mobile dismantling system as claimed in claim 1, wherein said mobile apparatus is a wheeled transport vehicle.

\* \* \* \* \*